(12) United States Patent
Bloom

(10) Patent No.: US 7,539,977 B1
(45) Date of Patent: May 26, 2009

(54) AUTOMATIC BUG ISOLATION IN COMPUTER PROGRAMMING LANGUAGES

(75) Inventor: Andrew W. Bloom, Boulder, CO (US)

(73) Assignee: Xilinx, Inc., San Jose, CA (US)

( * ) Notice: Subject to any disclaimer, the term of this patent is extended or adjusted under 35 U.S.C. 154(b) by 682 days.

(21) Appl. No.: 11/040,414

(22) Filed: Jan. 21, 2005

(51) Int. Cl.
*G06F 9/44* (2006.01)

(52) U.S. Cl. ..................................... 717/124

(58) Field of Classification Search ............ 717/124
See application file for complete search history.

(56) References Cited

U.S. PATENT DOCUMENTS

| | | | |
|---|---|---|---|
| 5,193,178 A * | 3/1993 | Chillarege et al. ............. 714/25 |
| 5,684,807 A * | 11/1997 | Bianchini et al. ........... 714/712 |
| 6,301,571 B1 * | 10/2001 | Tatsuoka ..................... 706/45 |
| 6,513,143 B1 * | 1/2003 | Bloom et al. ................... 716/3 |
| 6,560,721 B1 * | 5/2003 | Boardman et al. ............ 714/33 |
| 6,694,509 B1 * | 2/2004 | Stoval et al. ................ 717/124 |
| 6,810,508 B1 * | 10/2004 | Bloom et al. .................... 716/4 |
| 6,907,386 B1 * | 6/2005 | Liggesmeyer ............... 702/185 |
| 6,928,393 B2 * | 8/2005 | Czerwonka ................. 702/186 |
| 6,931,627 B2 * | 8/2005 | Arbouzov et al. ........... 717/124 |
| 6,980,916 B1 * | 12/2005 | Katz et al. ................... 702/119 |
| 7,165,074 B2 * | 1/2007 | Avvari et al. ................. 707/102 |
| 7,228,468 B2 * | 6/2007 | Wu et al. ..................... 714/710 |
| 2004/0133880 A1 * | 7/2004 | Paternostro et al. ......... 717/124 |
| 2005/0039079 A1 * | 2/2005 | Higashi et al. ................. 714/28 |
| 2005/0097535 A1 * | 5/2005 | Plum .......................... 717/151 |
| 2005/0120276 A1 * | 6/2005 | Kolawa et al. ................ 714/38 |
| 2005/0166094 A1 * | 7/2005 | Blackwell et al. ............. 714/38 |
| 2005/0268173 A1 * | 12/2005 | Kudukoli et al. .............. 714/38 |
| 2005/0268288 A1 * | 12/2005 | Nattinger .................... 717/125 |

* cited by examiner

*Primary Examiner*—Wei Y Zhen
*Assistant Examiner*—Chih-Ching Chow
(74) *Attorney, Agent, or Firm*—Kevin T. Cuenot

(57) ABSTRACT

A method, system, and apparatus relating to automatically reducing an amount of code necessary for reproducing errors within programming language code is presented. The method can include identifying optional nodes of a hierarchical tree of programming language code, wherein each node of the tree corresponds to a type of programming language construct. A target node can be selected from the optional nodes. The method further can include excluding the target node and any sub-nodes of the target node from the programming language code, and determining whether the programming language code passes at least one test case.

18 Claims, 4 Drawing Sheets

| Row | Exported Code | Item Class representation of the exported code |
|---|---|---|
| 1 | Entity ent is begin<br>    port (A : out integer;<br>         B : in integer;<br>         C : in integer);<br>end;<br><br>architecture arch of ent is begin<br>    A <= B + C;<br>End; | ITEM entity: "entity ent is begin" ... "end;"<br>    ITEM port: "port (" ... ");"<br>        ITEM signal_declaration : "signal A : out integer;"<br>        ITEM signal_declaration : "signal B : in integer;"<br>        ITEM signal_declaration : "signal C : in integer"<br><br>ITEM architecture: "architecture arch of ent is begin" ... "end;"<br>    ITEM signal_assignment : "A <=" ... ";"<br>        ITEM term: "B"<br>            ITEM addition_operator "+"<br>                ITEM term "C" |
| 2 | No code | Empty tree |
| 3 | entity ent is begin<br>    port (A : out integer;<br>         B : in integer;<br>         C : in integer);<br><br>architecture arch of ent is begin<br>end; | ITEM entity: "entity ent is begin" ... "end;"<br>    ITEM port: "port (" ... ");"<br>        ITEM signal_declaration : "signal A : out integer;"<br>        ITEM signal_declaration : "signal B : in integer;"<br>        ITEM signal_declaration : "signal C : in integer"<br><br>ITEM architecture: "architecture arch of ent is begin" ... "end;" |
| 4 | entity ent is begin<br>    port (A : out integer;<br>         B : in integer;<br>         C : in integer);<br>end;<br><br>architecture arch of ent is begin<br>    A <= B;<br>end; | ITEM entity: "entity ent is begin" ... "end;"<br>    ITEM port: "port (" ... ");"<br>        ITEM signal_declaration : "signal A : out integer;"<br>        ITEM signal_declaration : "signal B : in integer;"<br>        ITEM signal_declaration : "signal C : in integer"<br><br>ITEM architecture: "architecture arch of ent is begin" ... "end;"<br>    ITEM signal_assignment : "A <=" ... ";"<br>        ITEM term: "B" |
| 5 | entity ent is begin<br>    port (A : out integer;<br>         B : in integer;<br>end;<br><br>architecture arch of ent is begin<br>    A <= B;<br>end; | ITEM entity: "entity ent is begin" ... "end;"<br>    ITEM port: "port (" ... ");"<br>        ITEM signal_declaration : "signal A : out integer;"<br>        ITEM signal_declaration : "signal B : in integer;"<br><br>ITEM architecture: "architecture arch of ent is begin" ... "end;"<br>    ITEM signal_assignment : "A <=" ... ";"<br>        ITEM term: "B" |

FIG. 4

AUTOMATIC BUG ISOLATION IN COMPUTER PROGRAMMING LANGUAGES

BACKGROUND

1. Field of the Invention

This invention relates to the field of computer programming and, more particularly, to isolating errors within computer program code or hardware design languages.

2. Description of the Related Art

Locating errors, or "bugs", in computer program code, a programming language, or a hardware design language (hereafter "code") can be a very difficult and time consuming process. This is especially true when developing software-based development tools such as parsers, translators, analyzers, simulation engines, synthesizers, code generators, and the like. Many aspects of the debugging and testing process still are largely manual in nature. Such is the case whether the code, or software, to be debugged is written in a high level programming language such as C or a hardware description language (HDL) used for designing logic and/or integrated circuits.

Code can be tested by subjecting the code to a variety of different test cases. The test cases can be implemented using a software-based simulator, an integrated development environment, or other test system. Each test case can be designed to verify one or more particular functions of the code under development. By comparing the results of each test case against known or expected results, errors within the code under test can be identified. The presence of an error within the code is noted when the software fails one or more test cases. When an error is found, a developer manually examines the failing code to form a hypothesis as to which portion of the code caused the failure.

The developer manually selects a fragment of code believed to be the likely cause of the failure and either removes the code fragment from the software or modifies it. Once this candidate code fragment is removed or modified, the remaining code can be retested using updated test cases. If the program passes the test case(s) that previously failed, the developer determines that the candidate code fragment likely was the source of the error.

If the test case(s) fail despite the removal or modification of the candidate code fragment from the software, the developer determines that another code fragment is the source of the failure. At that point, the candidate code fragment can be reinserted into the software and another code fragment can be selected for removal. The developer can continue to select and remove and/or modify code fragments until the software passes the previously failed test case or cases. Once it is determined that a particular code fragment was the cause of the failure, the developer can devote more time to correcting any errors within that code fragment. Thus, the developer is left with fewer lines of code to debug.

Although more efficient than a detailed review of the entire code, this manual process still can take days for a developer to complete. It would be beneficial to have an automated technique for locating errors within computer code that overcomes the deficiencies described above.

SUMMARY OF THE INVENTION

The present invention provides a method, system, and apparatus relating to the automatic reduction in the amount of code necessary for reproducing an error condition. According to one embodiment, the method can include (a) identifying optional nodes of a hierarchical tree of programming language code. Notably, the hierarchical tree can be annotated to include optional and enabled data structures. In any case, each node of the hierarchical tree can correspond to a type of programming language construct. The method further can include (b) selecting a target node from the optional nodes, (c) excluding the target node and any sub-nodes of the target node from the programming language code, and (d) determining whether the programming language code passes at least one test case.

The method also can include (e) selecting a next optional node as the target node, and (f) performing steps (c) and (d) for the next target node. Steps (e) and (f) can be repeated for further test case iterations. The next target node can be a sub-node of the prior target node or can be in a same level of the hierarchical tree as the prior target node.

If the programming language code fails the test case, the target node and sub-nodes can continue to be excluded from the programming language code for subsequent test case iterations. If the programming language code passes the test case, the target node and sub-nodes can be identified as error producing. Accordingly, the target node can be enabled.

In the case of a passing test case, the method also can include selecting another optional node as the next target node, wherein the next target node is a sub-node of the prior target node, and excluding the next target node and any sub-nodes of the next target node from the programming language code. A determination can be made as to whether the programming language code passes the test case.

Other embodiments of the present invention can include a machine readable storage that has been programmed to cause a machine to perform the steps disclosed herein as well as a system having means for performing the various steps described herein.

BRIEF DESCRIPTION OF THE DRAWINGS

There are shown in the drawings, embodiments which are presently preferred, it being understood, however, that the invention is not limited to the precise arrangements and instrumentalities shown.

FIG. 4 is a table illustrating various states of the method described herein with reference to FIGS. 2 and 3.

DETAILED DESCRIPTION OF THE INVENTION

The inventive arrangements to be described herein provide an automated technique for reducing the amount of computer and/or programming language code (code) needed to reproduce bugs or errors within a computer program or description. In one embodiment, the present invention can be applied to computer programming in general. In another embodiment, the present invention can be used within the field of programming language-based tools relating to logic and/or circuit design. Accordingly, failures relating to synthesis, simulation, execution, parsing, compilation, and the like can be more effectively isolated within the code under test.

In accordance with the inventive arrangements disclosed herein, when software fails a test case, a portion of the code can be selectively and automatically excluded from the software. The software can be retested without this portion of the code. If the software fails the test case, the excluded portion of code can be reintroduced into the software and another portion of the code can be excluded.

The process can continue in an automated fashion until the software passes the test case or until all portions of the code have been tested. Portions of code whose removal results in the software passing the test case can be identified as including an error or bug. Thus, the inventive arrangements disclosed herein provide a technique for automatically reducing the amount of code required to reproduce a given error in the software and facilitate the isolation and location of such errors.

Figure 1:
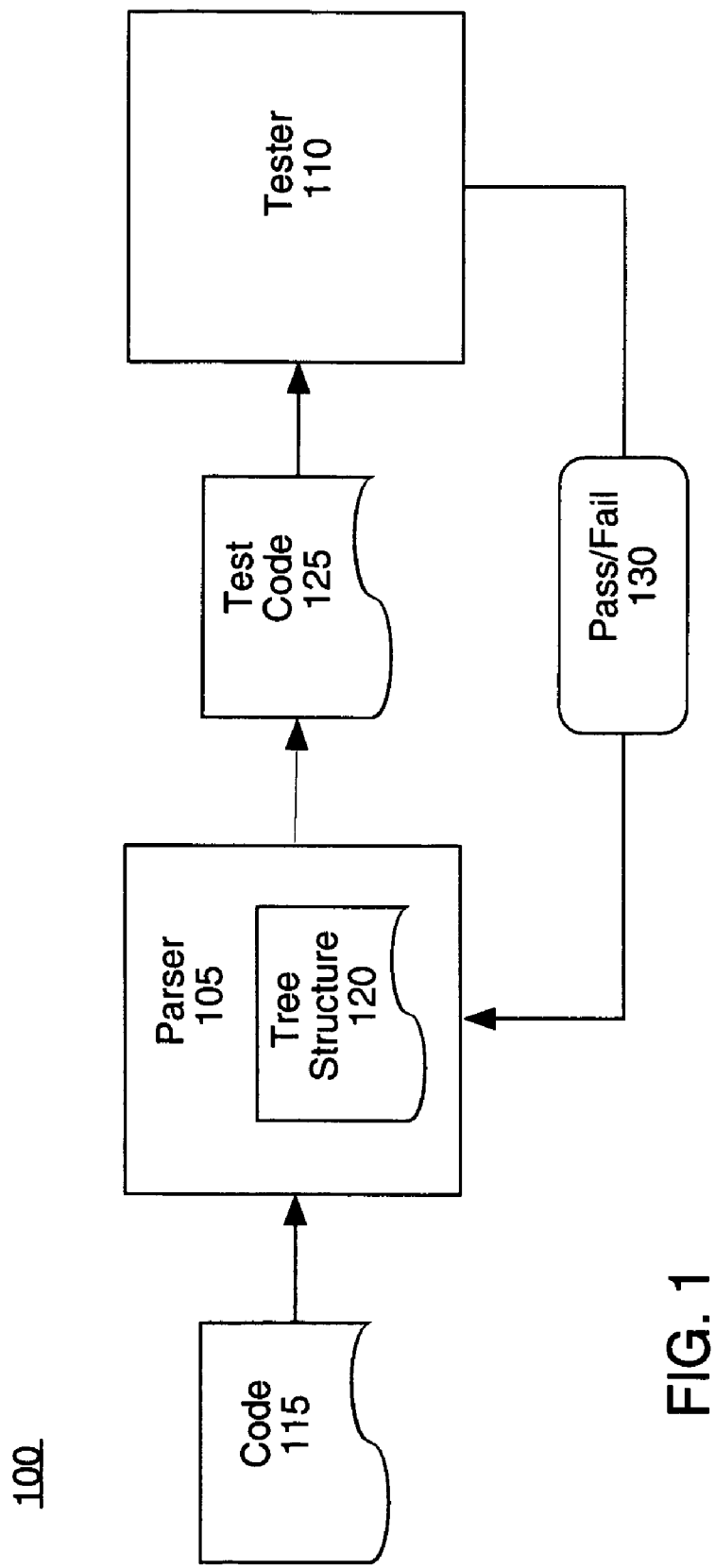
FIG. 1 is a schematic diagram illustrating a system for locating errors within programming language code in accordance with one embodiment of the present invention.

FIG. 1 is a schematic diagram illustrating a system 100 for locating errors within code in accordance with one embodiment of the present invention. The system 100 can include a parser 105 and a software test module (tester) 110. Each module can be implemented as a computer program executing within a suitable data processing system.

The parser 105 is a computer programming language parser. In one embodiment, the parser 105 can be configured to parse a hardware description language (HDL) including, but not limited to Verilog, Very High-Speed Integrated Circuits HDL (VHDL), or the like. In another embodiment, the parser can be configured to parse a computer language such as C, a C-related language, C++, JAVA, another high level language, or a low-level language such as assembly. In any case, the particular language upon which the parser 105 is to operate is not intended to be a limitation of the present invention.

The parser 105 can process received code 115, written or generated in a given programming language, and build a recursive tree structure 120. It should be appreciated that while the received code 115 is illustrated as a single file, the code 115 can be formed of more than one file or test file. The tree structure 120 is formed of hierarchically ordered nodes. Each node of the tree structure 120 can correspond to a particular language construct (construct) of the code 115.

A construct refers to a data structure used for a particular purpose. A construct can refer to a single programming language statement or a collection more than one statement such as a loop, method, function, or the like, where the collection has a particular function. Constructs also are defined by organizations such as the Institute of Electrical and Electronics Engineers (IEEE) and the American National Standards Institute (ANSI). These organizations set forth standards for programming languages such as C, C++, Verilog, and VHDL, with each standard defining the available constructs for a given language. The IEEE, for example, has released *IEEE Standard* 1394-1995 which is based on Verilog HDL.

The tree structure 120 is a hierarchical ordering of nodes representing the various constructs of the code 115. The nodes, also referred to as "item class" nodes, as each corresponds to a base construct of the code being parsed, can include additional data structures. In one embodiment, each node can include one or more data structures for indicating whether the node is optional and enabled. In another embodiment, however, one or both of the optional and enabled data structures for each node can be stored in a different file than the tree structure 120. Regardless, the optional and enabled data structures can be implemented as any of a variety of different data structures such as flags or data fields.

In one embodiment, the parser 105 automatically determines whether nodes are optional. The parser 105 can evaluate each node using a set of rules. The rules can be derived from a standard governing the constructs of the particular language in which the code 115 has been written. In another embodiment, a separate file can be used to specify which constructs of a given programming language are optional constructs. Thus, the listing of optional constructs, or the rules for identifying optional constructs as the case may be, can be derived automatically from a review of the construction of the language as specified in a language reference manual described herein. A node can be considered optional if the node and its sub-nodes can be eliminated from the code such that the remaining code is valid, or well formed, for testing purposes.

Optional nodes can be enabled or disabled. The enabled status of a node indicates whether a given optional construct is to be included or used in the software to be tested. The parser 105 can process the code 115 to identify any nodes that are optional. The parser 105 then can examine particular nodes from the tree structure 120 that have been identified as optional and selectively disable a node. Notably, when a node is disabled, the disabled node and its sub-nodes are not included in the test code to be tested. Such nodes are excluded from exportation for testing purposes. The parser 105 then exports or writes out the resulting test code 125. The test code 125 is similar to the received code 115, with the noted exception that the constructs corresponding to the disabled node and sub-nodes beneath have been excluded, modified, or removed.

The test code 125 is provided to the tester 110. The tester 110 can be a simulation environment or other software-based tool which is capable of executing the test code 125. Further, the tester 110 can subject the test code 125 to one or more test cases. That is, the tester 110 can provide predetermined input to the test code 125 and monitor the test case results against expected or known results. In this manner, the tester 110 can determine whether the test code 125 passed or failed the test case. As shown, a pass/fail indication 130 can be passed back to the parser 105.

Based upon the pass/fail indication 130, the parser 105 can selectively enable the nodes that were disabled and/or disable other nodes. Assuming the test code 115 has at least one error or failure, if the test code 125 fails the test case, the parser 105 assumes that the disabled nodes are not the source of the error or failure. These nodes can remain disabled or excluded. In that case, the parser 125 can disable additional nodes and continue testing. If the test code 125 passes the test case, the parser 105 assumes that one or more of the disabled nodes is the source of the error. These nodes can be identified as error producing. Such nodes are considered necessary for reproducing the error.

In another embodiment, the test code may require a test environment (not shown) to validate the test code. Test environments are available for many different programming languages. With respect to VHDL code, for example, a test bench can be used. Such test benches can be automatically updated to maintain consistency with updated or modified code. Examples of test benches that can be used with the inventive arrangements disclosed herein are described in U.S. Pat. Nos. 6,513,143 and 6,810,508.

While the system 100 has been provided as one possible embodiment, it should be appreciated that other architectures also are within the scope of the present invention. In another embodiment, an auto-test case generator can be used in lieu of a parser. In still another embodiment, a conventional parser can be used in conjunction with an interface or translation layer. The interface layer can generate the optional and enabled data structures, identify optional nodes, and store an indication as to whether the nodes are optional.

An interface layer, as described above, can process a tree structure that lacks optional and/or enabled data structures.

The interface layer can annotate such a tree structure to include the optional and enabled data structures and selectively enable and/or disable nodes as described herein. Alternatively, the optional and enabled data structures for each node of the tree structure can be stored within a separate file that is associated with the tree structure. Each node of the tree structure 120 can correspond to a particular optional and/or enabled data structure in the separate file.

While the parser 105 and the tester 110 have been illustrated as two distinct computer programs, the present invention is not so limited. It should be appreciated that the functions attributed to the parser 105 and/or the tester 110 can be implemented as a collection of one or more computer programs. As such, the present invention is not intended to be limited solely to those arrangements depicted in FIG. 1.

Figure 2:
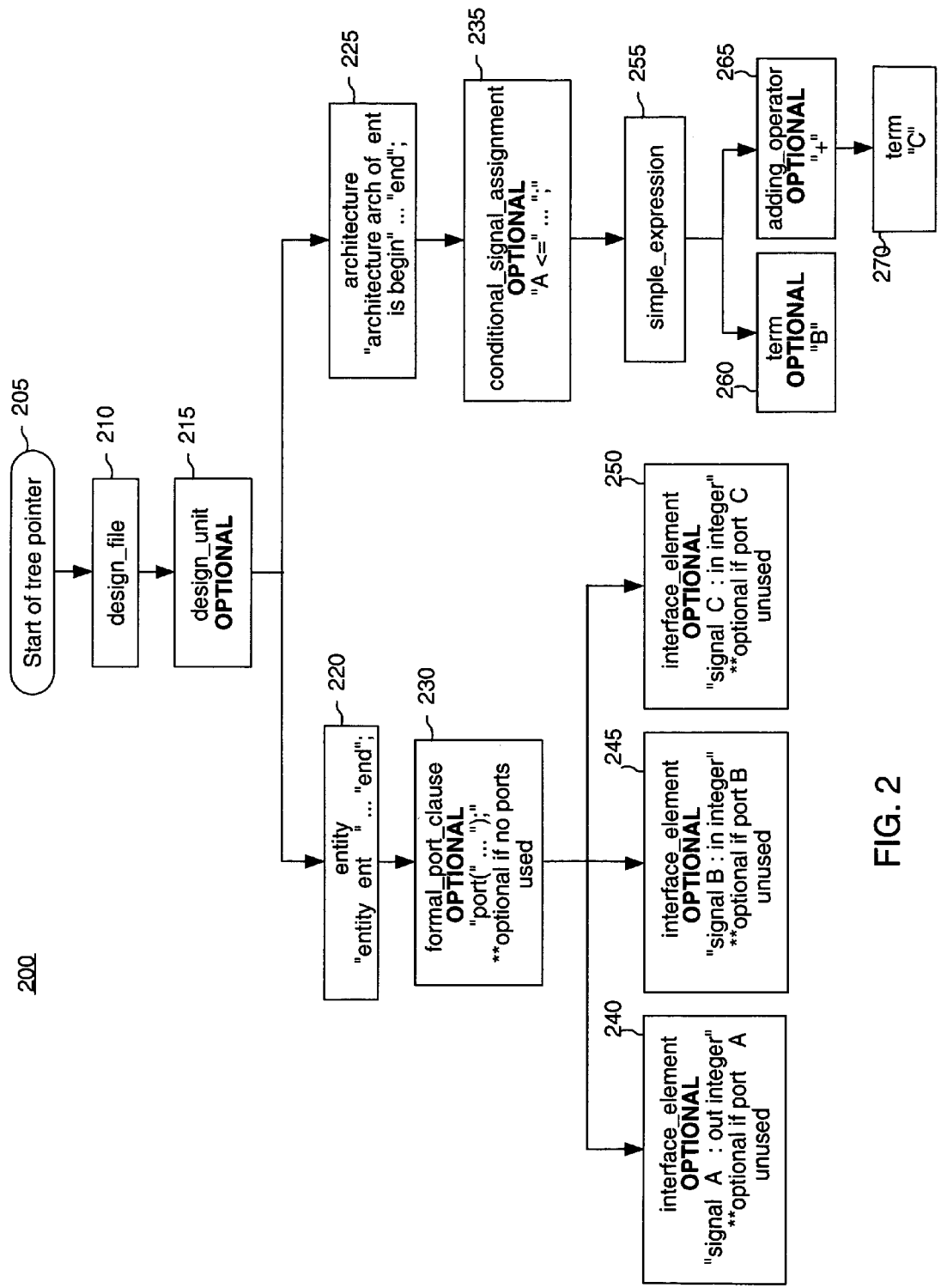
FIG. 2 is a graphic representation of an item class tree in accordance with another embodiment of the present invention.

FIG. 2 is a graphic representation of an item class tree 200 in accordance with another embodiment of the present invention. The tree 200 is representative of a simplified item class tree for the expression "A=B+C" as expressed in VHDL. The complete design file in VHDL for this expression is:

entity ent is begin
port (A: out integer;
   B: in integer;
   C: in integer);
End;
architecture arch of ent is begin
A<=B+C;
end;

As generated by a parser or other software-based development tool, the tree 200 can include nodes 205-270. As shown, a number of item class nodes are recursively connected to sub-nodes, also referred to as child nodes. The root node 205 indicates the start of the tree 200 hierarchy. Sub-node 210 indicates that the tree 200 hierarchy pertains to a design file.

Any nodes that have been determined to be optional, have been annotated as such. Thus, nodes 215, 230, 235, 240, 245, 250, 260, and 265 have been labeled as optional nodes. These optional nodes can be selectively disabled. As noted, while the tree 200 indicates which nodes are optional, in another embodiment such information can be stored in a separate file, table, or other data structure.

When a node is marked optional, it may be selectively disabled. An optional node can be selected as a target node and disabled. When disabled, the construct corresponding to the target node and constructs corresponding to any sub-nodes of the target node within the tree 200 are not exported as test code. In illustration, if node 230 is disabled, sub-nodes 240, 245, and 250 are excluded from the test code. Sub-nodes correspond to any nodes in a level of the tree hierarchy below a given target node that are within a branch of the tree 200 that, at one point, connects to the target node. Exclusion of a target node and corresponding sub-nodes results in a smaller test file than the original code design.

The nodes of tree 200 can specify strings of text to be printed out if the node is enabled. Text corresponding to a disabled node or sub-nodes of a disabled node is not printed out. Such action allows human review of which constructs have been included within exported test code.

Another manner of reducing the size of code to be tested is to disable nodes that are related to nodes which already have been disabled. With respect to logic and/or circuit design, this can occur when signals are eliminated from a design. The unused signals, or variables, often are removed from the resulting design to further reduce the size of the test code.

Within the expression "A=B+C", it can be seen that node 235 corresponding to "A" is optional in that if "A" is disabled, no equation is defined. Valid code, however, still results because the expression is simply excluded or left out. If "A" is excluded or disabled, "B", corresponding to node 260, and "+C", corresponding to node 265, also can be disabled while still producing valid test code. When "A" is enabled, "B" and "+C" are both optional. The "=", however, would not be optional as removal of "=" from the expression results in improper expression syntax and invalid test code.

Other cases of optimization, or test code reduction, can include, but are not limited to, disabling external statements without usage, unused library references, and the like. In one embodiment, the optimization of these nodes can be implemented as a multi-pass approach. In that case, the optional data structure can be a value (e.g., an integer) rather than a Boolean true or false. All nodes can be walked repeatedly, and can be tested when the optional flag's value matches that of the pass count. Such an embodiment accounts for cases where structures become optional or conditional when other related structures are eliminated. One example of this situation is where a port definition is optional only when the respective signal is not used within the design. Another example is when the design contains mixed data types. If one of the types is no longer used, the library reference for that data type can be removed.

Figure 3:
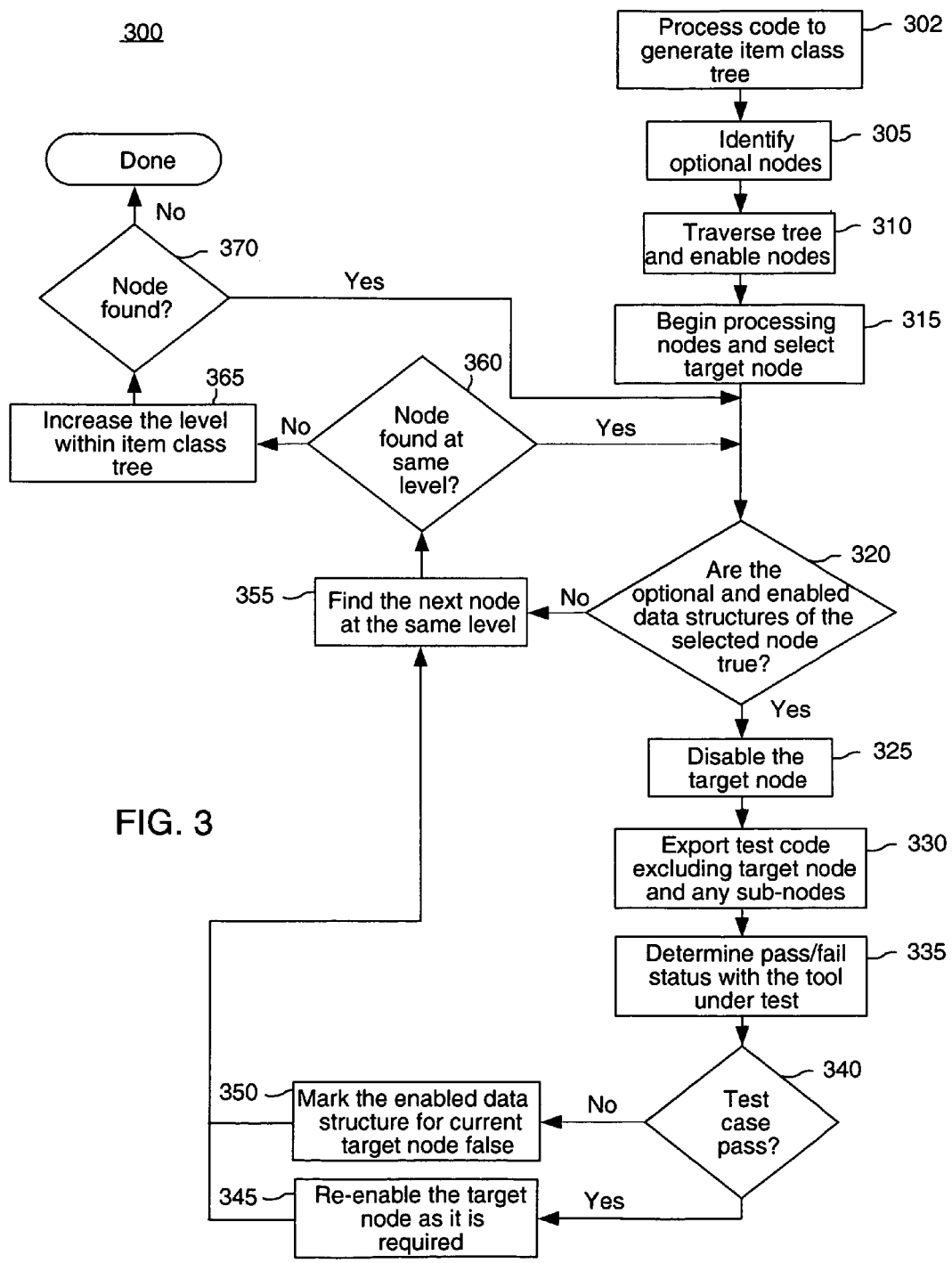
FIG. 3 is a flow chart illustrating a method of locating errors within programming language code in accordance with yet another embodiment of the present invention.

FIG. 3 is a flow chart illustrating a method 300 of locating errors within code in accordance with yet another embodiment of the present invention. The method 300 can begin in step 302 where a failing design file or program is processed to generate an item class tree. In step 305, the optional nodes of the item class tree can be identified. Generally, the item class tree can be processed from the top level down, level by level. Each node at a current level can be checked to determine whether that node is required for valid test code generation. Thus, the nodes at the highest level can be processed first. Sub-nodes, or branches of sub-nodes, can be processed after the higher level nodes.

In step 310, the item class tree can be traversed and the enable data structure for each optional node can be set to true, indicating that each optional construct initially is to be included in the test code. In step 315, the method can begin to traverse the item class tree and process each sub-node. As before, the item class tree can be processed from the top level down, level by level. Accordingly, a first target node can be selected for processing.

In step 320, a determination can be made as to whether the optional and enabled data structures for the selected target node have been set to true. This ensures that mandatory nodes will be included within the test code. It should be appreciated that mandatory nodes are mandatory because of the nodes that are located beneath the subject node. In the multi-pass approach, mandatory nodes can become optional as related code which may or may not be beneath the mandatory node is removed. If both the optional and enabled data structures have been set to true, the method can continue to step 325. If not, the method can proceed to step 355.

Continuing with step 325, in the case where the node is optional and enabled, the target node can be disabled. The enabled data structure for the target node can be set to false. In step 330, the test code can be exported without the disabled target node or any sub-node of the target node. The target node and its sub-nodes can be said to be disabled.

In step 335, the test code can be tested and subjected to a test case. The test case can be the same test case that was initially used to classify the design file as failing in step 305. Thus, the status of the test code can be determined in step 335 based upon whether the test code passed or failed the test case.

In step 340, if the test case was passed, the method can continue to step 345. If not, the method can proceed to step 350.

In step 345, in the case where the test case was passed, the target node can be enabled. Because the test case was passed, the source of the error can be determined to be at least one of the target node or any of its sub-nodes. Accordingly, these nodes are necessary for reproducing the error and the enabled data structure for the target node and/or any sub-nodes can be set to true.

In step 350, in the case where the test case was failed, the current target node and any sub-nodes can remain disabled. That is, as the test case failed without the target node and sub-nodes, these nodes are not necessary for reproducing the error condition. As such, the enabled data structure for the target node can be set to false so that the nodes continue to be excluded from subsequent test case iterations.

From each of steps 345 and 350, the method can proceed to step 355. The method also can proceed to step 355 from step 320 in the case where the selected node was not enabled. In any case, in step 355 a next node can be selected as the target node for processing. The next target node can be selected from the same level within the item class tree as the prior target node in the previous iteration.

In step 360, a determination can be made as to whether a node at that level was found. If so, the method can loop back to step 320 to repeat as may be required. If not, however, the method can proceed to step 365. In step 365, the method can proceed to the next level within the item class tree. The level is increased such that the next level from which the method operates is one level deeper, or below the prior target node, within the item class tree hierarchy.

In step 370, a determination can be made as to whether an optional node at this next level exists. If so, that node is selected as the target node and the method proceeds to step 320 to continue processing. If not, the method can end. When the method ends, the minimal case, or minimal code necessary, is identified for reproducing the error condition from the code under test.

FIG. 4 is a table illustrating various states of the method described with reference to FIGS. 2 and 3. For purposes of illustration, it is assumed that the code includes constructs defining the expression "A=B+C" and, further, that this expression causes the code to fail a test case in some respect. The table includes an "Exported code" column indicating the test code that is exported for testing during a given iteration of the method and an "Item Class Representation of the Exported Code" column that indicates the nodes of the hierarchical item class tree that are enabled, or included, for a given iteration.

Row 1 illustrates a first iteration where the code initially fails a test case. The code that is exported includes each construct necessary for creating the expression "A=B+C". The item class nodes corresponding to the exported code are shown.

Row 2 illustrates a next iteration where the first optional node 215 is selected as the target node and is disabled. Accordingly, in this iteration, node 215 and all of the sub-nodes beneath node 215 are disabled and/or excluded from exportation. In consequence, each construct involved in the creation of the expression is excluded from the test code. In this iteration, the test code passes the test case without the inclusion of any constructs relating to the expression, thereby indicating that the failure of the test case is likely caused by the excluded code defining the expression.

Row 3 illustrates an iteration where the target node 215 and its sub-nodes have been enabled. A second node 235 is selected as the new target node. Node 235 is a sub-node below the prior target node 215. The new target node 235 is disabled. Accordingly, node 235 and its sub-nodes beneath are excluded from the test code. In consequence, the assignment "A<=B+C" is excluded from the exported code. The declarations, however, can remain. In this iteration, the code passes the test case. Thus, the code necessary for reproducing the error condition has been further reduced from the case illustrated in Row 2.

Row 4 illustrates an iteration where the target node 235 and its sub-nodes are enabled and sub-node 265 is selected as the new target node. Target node 265 can be disabled resulting in an expression of "A<=B". In this iteration, the test code fails the test case. At this point, a first pass in reducing the code necessary for reproducing the error is complete as the current branch of the hierarchical tree has been exhausted. The optional data structure for each node then can be set to false, except for port definition C, which is no longer used. The optimization can be rerun and again fails the test case.

Row 5 illustrates the case where the ports are optimized during the second pass by removing the unused port C corresponding to nodes 265 and 270. After completion of the second pass, the code has been fully reduced. The reduced code can be re-run and again fails the test case. Thus row 5 has the reduced code that has the error.

The inventive arrangements disclosed herein provide a solution for reducing the amount of code needed to reproduce bugs or errors within a programming language-based application, description, or the like. While the present invention can be applied to computer programming in general, it also can be used within the field of programming language-based tools relating to logic and/or circuit design. As such, failures with respect to synthesis, simulation, execution, parsing, compilation, etc. can be more effectively isolated within the code under test.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or software, in the present context, means any expression, in any language, code or notation, of a set of instructions intended to cause a system having an information processing capability to perform a particular function either directly or after either or both of the following: a) conversion to another language, code, or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. An automated method for reducing an amount of code necessary for reproducing an error within programming language code comprising:

parsing the programming language code by use of an automated parser;

identifying optional nodes of a hierarchical tree of the programming language code, wherein each node of the hierarchical tree corresponds to a defined type of programming language construct, and upon detecting a test case error, locating the error in the programming code by:

selecting a target node from the Optional nodes;

excluding the target node and sub-nodes of the target node from the programming language code;

determining whether the programming language code, after exclusion of the target node and sub-nodes of the target node, passes at least one test case;

identifying the target node and sub-nodes of the target node as necessary for reproducing the error if the at least one test case is passed; and if the at least one test case is failed, including the target node; and repeating the steps of selecting a target node, excluding the target node, and determining whether the programming code passes the at least one test case for a next target node.

2. The method of claim 1, further comprising repeating said selecting said next optional node and performing steps for further test case iterations.

3. The method of claim 1, wherein the next target node is a sub-node of the prior target node.

4. The method of claim 1, wherein the next target node is in a same level of the hierarchical tree as the prior target node.

5. The method of claim 1, further comprising, if the programming language code fails the test case, excluding the target node and sub-nodes for subsequent test case iterations.

6. The method of claim 1, further comprising, if the programming language code passes the test case, identifying the target node and sub-nodes as error producing.

7. The method of claim 6, further comprising enabling the target node.

8. The method of claim 1, further comprising annotating the hierarchical tree to include optional and enabled data structures.

9. A machine readable storage, having stored thereon a computer program having a plurality of code sections executable by a machine for causing the machine to perform the steps of:

parsing the programming language code by use of an automated parser;

identifying optional nodes of a hierarchical tree of the programming language code, wherein each node of the hierarchical tree corresponds to a defined type of programming language construct; and upon detecting a test case error, locating the error in the programming code by:

selecting a target node from the optional nodes;

excluding the target node and sub-nodes of the target node from the programming language code;

determining whether the programming language code, after exclusion of the target node and sub-nodes of the target node, passes at least one test case;

identifying the target node and sub-nodes of the target node as necessary for reproducing the error when the at least one test case is passed; and if the at least one test case is failed, including the target node; and repeating the steps of selecting a target node, excluding the target node, and determining whether the programming code passes the at least one test case for a next target node.

10. The machine readable storage of claim 9, further comprising, if the programming language code passes the test case, identifying the target node and sub-nodes as error producing.

11. An automated computer-based system for reducing an amount of code necessary for reproducing errors within programming language code, the computer-based system comprising:

Memory mean for storage and parsing the programming language code by use of an automated parser;

means for identifying optional nodes of a hierarchical tree of the programming language, code, wherein each node of the hierarchical tree corresponds to a defined type of programming language construct; and means for locating the error in the programming code upon detecting a test case error by:

selecting a target node from the optional nodes;

excluding the target node and sub-nodes of the target, node from the programming language code;

determining whether the programming language code, after exclusion of the target node and sub-nodes of the target node, passes at least one test case;

identifying the target node and sub-nodes of the target node, as necessary for reproducing the error if the at least one test case is passed; and if the at least one test case is failed, including the target node; and repeating the steps of selecting a next target node, excluding the next target node, and determining whether the programming code passes the at least one test case for a next target node.

12. The system of claim 11, further comprising:

means for selecting a next optional node as the target node; and means for causing said excluding and determining means to operate on the next target node.

13. The system of claim 12, wherein the next target node is a sub-node of the prior target node.

14. The system of claim 12, wherein the next target node is in a same level of the hierarchical tree as the prior target node.

15. The system of claim 11, further comprising means for excluding the target node and sub-nodes for subsequent test case iterations if the programming language code fails the test case.

16. The system of claim 11, further comprising means for identifying the target node and sub-nodes as error producing if the programming language code passes the test case.

17. The system of claim 16, further comprising means for enabling the target node.

18. The system of claim 11, further comprising annotating the tree structure to include optional and enabled data structures.

* * * * *